3,166,434
PROCESS OF COATING POROUS SUBSTRATES WITH POLYESTER RESINS COMPRISING FUMARIC ACID, POLYOXYALKYLENE GLYCOL AND DICYCLOPENTADIENE
Edward A. Gauger, Jr., Oakland, Calif., assignor to De Soto Chemical Coatings, Inc., Chicago, Ill., a corporation of Delaware
Filed Dec. 11, 1961, Ser. No. 158,341
18 Claims. (Cl. 117—57)

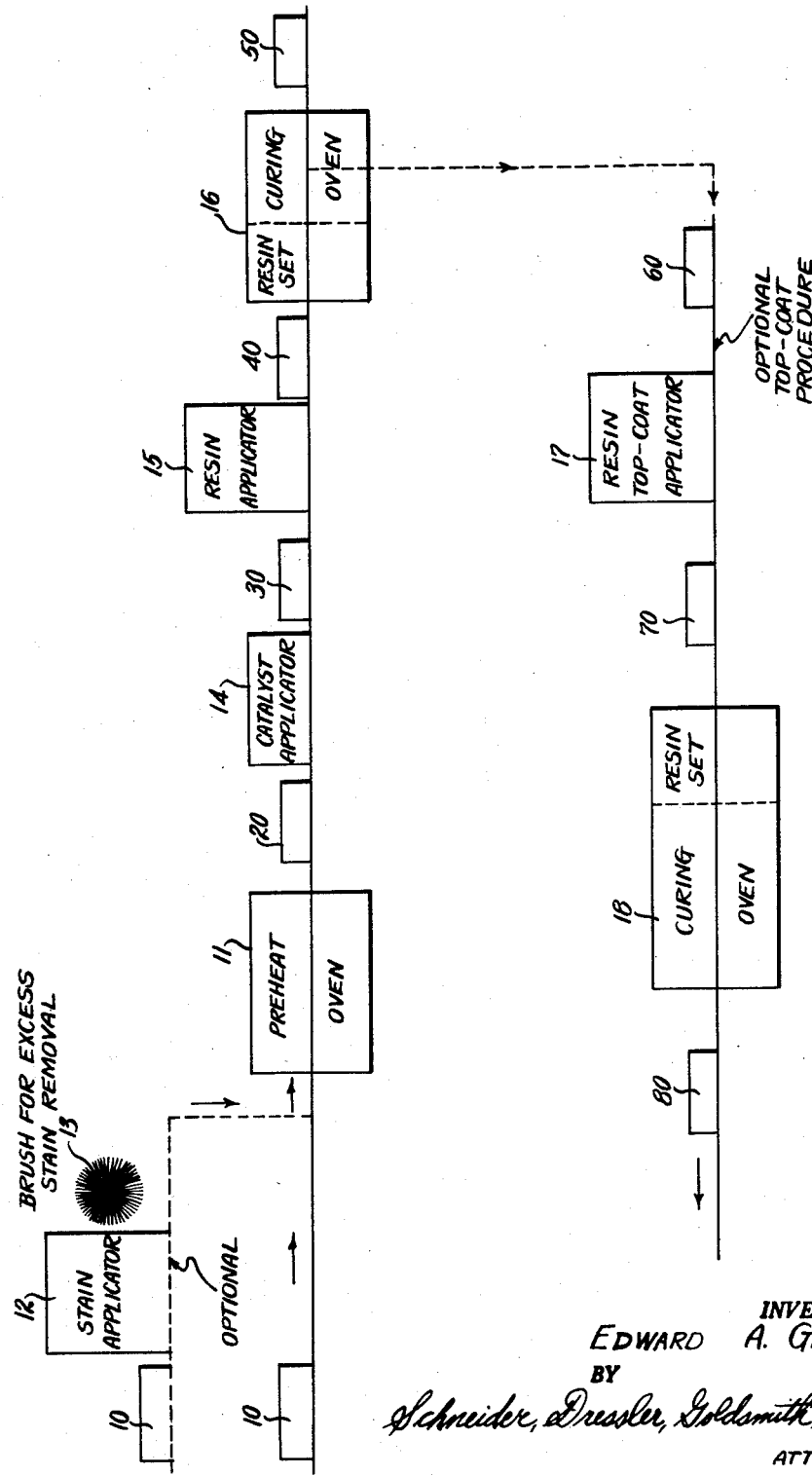

The present invention relates to the surface finishing of porous substrates, and especially cellulosic surfaces such as hardwoods, soft woods, particle boards, chipboards, pressed woods, paper etc. The invention is especially concerned with the application of polyester resins as surface coatings in a rapid and continuous process to form protective films of desirable properties.

The application of polyester resins to cellulosic surfaces is known. However, many difficulties are encountered, especially in a high speed process as required by most lumber mills. Application of polyester coatings, as known to the art, includes the application of two successive layers, one layer containing a catalyst and the second layer containing the polyester resin, desirably in admixture with a promoter or accelerator, the two layers merging in situ to enable cure to take place. However, the process is slow and adhesion of the polyester coating to the substrate is frequently inadequate requiring the use of a sealer. Moreover, application of heat to speed the process tends to cause blistering, especially when thick layers are applied.

The prior polyester coating systems have the further disadvantage of being inhibited by air during the curing stage. Several methods have been used to exclude air from the surface of the coating, but these methods leave much to be desired. Illustrative of these is the use of a wax-containing polyester system which exudes a wax during the cure to form a barrier against air at the surface of the coating. The final product so-produced is dull in finish and must be worked as by sanding and polishing to prepare a marketable product. The wax present at the surface of the coating must also be sanded off its subsequent coatings are to be applied. A second approach to the problem has been the use of a fast curing resin which forms its own protective layer. This has proven unsatisfactory in that the coating underneath the protective layer is not sufficiently cured, yielding a product characterized by inadequate mar resistance.

As will be evident, the prior polyester cure on porous substrates is quite difficult and the art has been largely restricted to undesirably slow processes, the production of thin coatings, and the production of coatings of inadequate properties.

The invention, in facing the problem of providing polyester coatings, and especially thick coatings, possessing good properties and good finish on porous substrates in a rapid process, encounters a problem of considerable difficulty and complexity.

In accordance with the invention, certain polyester resins are selected, the surface to be coated is preheated to drive air out of the porous substrate prior to resin application and the catalyst is applied to the porous surface prior to application of the resin, thus providing a rapid and efficient process using stable polyester resin solutions. Due to the absence of entrapped air and the quick gelling of the polyester resin on the heated catalyst impregnated surface, even thick coatings can be applied to the porous substrate without blistering the coating. Moreover, since the polyesters used are rapidly curable at low temperature in the presence of air, the cured product has good properties, a hard finish of any desired gloss without the need for subsequent treatment, and the process is rapid and continuous as is desired in commerce.

The polyester resins utilized in the present invention are prepared by heat-reacting an ethylenically unsaturated dicarboxylic acid component, including a major molar proportion of fumaric acid, with a glycol component, including a major molar proportion of ether glycol and from 0.2–0.6 mole of dicyclopentadiene per mole of ethylenically unsaturated dicarboxylic acid.

These polyester resins are mixed with one or more ethylenically unsaturated monomers, especially vinyl monomers which function to cross-link and thermoset the polyester resin in the presence of a free-radical generating polymerization catalyst and sufficient heat to cause the catalyst to release the required free radicals.

These mixtures of specified polyester resin and vinyl monomer, when catalyzed by free radicals cure with great rapidity at very moderate temperatures and the cure takes place to provide good properties, even in the presence of air.

Referring more particularly to the unsaturated polyester resins which are used in the invention, the essential unsaturated dicarboxylic acid component is fumaric acid. While other ethylenically unsaturated carboxylic acids may be present in an amount up to 50 mol percent based on the total mols of unsaturated dicarboxylic acid, excessive substitution of fumaric acid by other acids, even by maleic acid, which is an isomer of fumaric acid, is not satisfactory because the desired new properties are unduly sacrificed. Preferably, unsaturated acids other than fumaric are present in an amount not exceeding 15 mol percent and are most preferably completely absent. Other dicarboxylic acids which may optionally be present in small amount, e.g., up to 10 mol percent based on total acids, are illustrated by one or more of the phthalic acids, adipic acid, etc.

The glycol component is essentially limited to ether glycols such is diethylene glycol, triethylene glycol, dibutylene glycol and similar polyoxyalkylene glycols having a molecular weight up to about 1200, preferably not in excess of 600, the preferred glycols being those of lowest molecular weight in each category, e.g., the diglycol.

The use of ether glycols is important to the achievement of mar resistance, but it does not eliminate the presence, or even the desirability, of using minor proportions up to 50 mol percent, based on total glycol, of other glycols, especially short chain glycols such as ethylene glycol, so long as the ether glycol is present in the system to exert its function. Suitable glycols which may be present in minor proportion are illustrated by ethylene glycol, propylene glycol, butylene glycol, 1,5-pentanediol, di- and trimethylol propane, neopentyl glycol, bisphenol based diols, etc. Polyhydric alcohols containing three or more reactive hydroxy groups such as glycerin, pentaerythritol, etc., are desirably absent but minor amounts up to about 10 mol percent may be tolerated, especially when the polyesterification reaction is conducted with care to avoid gelation. Preferably, at least 60 mol percent of the glycol component is polyoxyalkylene glycol.

The dicarboxylic acid component and the glycol component are desirably used in equivalent proportions of from 1.5:1 to 1:1.5, based on carboxyl and hydroxyl respectively, preferably in equivalent proportions of from 1.25:1 to 1:1.25. It is particularly preferred to employ at least 5 equivalent percent of excess hydroxyl functionality.

The use of dicyclopentadiene is also important as is illustrated by the fact that substitution of cyclopentadiene or pentadiene for dicyclopentadiene fails to produce a polyester having the unique fast curing properties which are required. Again, and while dicyclopentadiene is important, minor amounts, up to 50 mol percent of the dicyclopentadiene component, may be replaced by other dienes such as cyclopentadiene, any of the pentadienes, 1,4-butadiene, tricyclopentadiene and tetracyclopentadiene. Preferably, at least 75 mol percent of the diene component is dicyclopentadiene.

At least 40% of the unsaturated dicarboxylic acid component is permitted to remain unreacted during production of the polyester, so as to retain sufficient $\alpha,\beta$-ethylenic unsaturation for the later copolymerization with the vinyl monomer.

The dicyclopentadiene component is desirably, but not necessarily, incorpoarted into the polyester before the polyesterification reaction is completed. Thus, it is preferred to coreact the dicyclopentadiene with the unsaturated dicarboxylic acid and ether glycol components of the polyester at the same time that the polyester is being formed, such procedure including the formation of an adduct between the dicyclopentadiene and the unsaturated dicarboxylic acid.

The resinous polyesters which are produced are used in combination with ethylenically unsaturated monomers and low temperature reactive free-radical generating catalysts.

As is known in the polyester art in which unsaturated polyesters are cured with copolymerizable ethylenically unsaturated monomer, the unsaturation in the monomer is desirably a vinylidene unsaturation, in which the monomer has the structure $CH_2=C<$, the preferred monomers for this purpose being vinyl monomers such as styrene, vinyl toluene, acrylonitrile, and methyl methacrylate. Nevertheless, other vinyl monomers such as butyl methacrylate, ethyl acrylate, ethylene glycol dimethacrylate, and ethylene glycol acrylate are well adapted for the cross-linking cure and the specific unsaturated monomer which is selected is not a primary feature of the invention, any ethylenically unsaturated monomer capable of copolymerizing being broadly suitable.

It is generally desired to employ at least 0.5 mol of styrene or other copolymerizable ethylenically unsaturated monomer per equivalent of available $\alpha,\beta$-ethylenic unsaturation in the polyester. Preferably, at least 1 mol of styrene is used and most preferably from 2–4 mols of styrene per equivalent of an $\alpha,\beta$-ethylenic unsaturation is used to yield the most desirable properties. Larger excesses of ethylenically unsaturated monomer are also permissible, though these do not generally provide the best physical and chemical characteristics.

The addition polymerization cross-linked cure used in the invention is activated by a free-radial generating polymerization catalyst which is active at low to moderate tempeartures, e.g., from 30–80° C., and preferably from 30–50° C. Various free-radical generating catalysts are operative at low temperatures, these being illustrated by methyl ethyl ketone peroxide, acetyl benzoyl peroxide, peracetic acid, hydoxybutyl peroxide, isopropyl percarbonate cyclohexanone peroxide, cyclohexyl peroxide, 2,4-dichlorobenzoyl peroxide, and cumene hydroperoxide. Methyl ethyl ketone peroxide is a preferred catalyst at the low curing temperatures primarily contemplated.

Free-radical generating catalysts which are active to generate free-radicals at somewhat elevated temperatures of about 60° C., and which are still adapted for rapid cure at moderately low baking temperatures, are illustrated by t-butyl hydroperoxide, methyl amyl ketone peroxide, acetyl peroxide, lauroyl peroxide, methyl cyclohexyl hydroperoxide, t-butyl permaleic acid, t-butyl perbenzoate, di-t-butyl diperphthalate, N,N'-azodiisobutyronitrile and benzoyl peroxide.

It is preferred to apply the above catalysts to the surface of the board from organic solvent solution medium. However, hydrogen peroxide or other water-soluble free-radical-generating catalyst may be used if it is applied from aqueous solution and if the solution is thoroughly dried to remove all water before coating. This drying step may be desirably combined with the preheat step required in the invention.

In accordance with the present invention, porous substrates, espeically wood panels, are coated in a rapid and continuous manner utilizing the polyester resin systems described hereinbefore. The invention will be more fully described in conjunction with the accompanying drawing which is a schematic representation illustrating, in flow sheet form, the process of the invention.

In the drawing, porous substrates, such as wood panels indicated generally by numeral 10, are preheated in an oven 11 of any conventional type. The substrate is heated sufficiently to cause the entrapped air to be driven off without unduly scorching the substrate. It is essential to the method of the invention that the entrapped air be driven out of the porous substrate, thereby necessitating a temperature at the surface of the substrate of at least 120° F. Preferably, the panels 10 are heated to a point where the temperature at the surface of the substrate is at least about 140° F. The upper limit of the heating range is not significant to the invention so long as the surface of the panel is not unduly scorched.

If desired, prior to heating, the substrate may be stained, printed or colored in any conventional manner, as illustrated by stain applicator 12, a brush 13 for removal of excess stain being illustrated. As will be evident, the staining or other pretreatment of the substrate is wholly optional.

A free-radical generating polymerization catalyst is applied to the surface of the panel while the surface is still at an elevated temperature, the hot panels being identified by numeral 20. Desirably catalyst application is subsequent to preheating, but the reverse procedure may also be used, especially when those catalysts stable at more elevated temperature are selected. Thus, catalyst application and substrate preheating may broadly take place in any order. The catalyst is applied in any carrying medium which is compatible with the subsequently applied polyester resin. Thus, organic solvents or resin plasticizers may be used. It is necessary in the invention that the temperature at the surface of the porous substrate be sufficiently elevated to cause the catalyst to generate free-radicals. While the temperature at which free-radicals are generated will vary depending upon catalyst selection, the preheated board should have a temperature of at least 100° F. preferably at least 120° F. to insure release of free-radicals, the achievement of a rapid cure and to minimize temperature increase within the porous substrate during subsequent application of elevated curing temperatures. Impregnation of the porous substrate with the applied catalyst is facilitated by a slight vacuum produced by the cooling effect of the atmosphere and the applied catalyst. The free-radical generating polymerization catalyst can be applied by any conventional coating means as identified by numeral 14. Preferably, the catalyst is applied to flat surfaces using a direct roller coater, equipped with a non oxidizing roller cover. When the catalyst is applied to uneven surfaces such as tongue and groove joints, a spray applicator can be advantageously utilized.

The warm catalyst impregnated panel identified at 30, is then coated with a layer of the polyester resin described hereinbefore, preferably a thick layer. At the time of polyester resin application and for the purposes noted in the preceding paragraph, the surface of the catalyst-impregnated board should have a temperature of at least 95° F., preferably at least 110° F. The resin is warmed by the heat of the panel and becomes infused by the active catalyst and gels quickly to seal the porous substrate. The polyester resin coating on the substrate is then allowed to stand for a short period of time, preferably in a warm atmosphere to permit the catalyst-containing resin to advance in cure, e.g., to partially set or gel, which occurs quickly. The instant gelling and partial setting of the resin coating seals the surface of the porous substrate and resists excessive softening when subjected to further moderate heat treatment, and this prevents the heat of the curing operation from blistering the coating. The gelled polyester-coated substrate is identified by numeral 40.

The gelled coated substrate 40 is then heat cured using conventional heating means identified by numeral 16. In the preferred embodiment of the invention, the panel 40 is cured by subjecting it to a temperature of 100–180° F. for a minimum of 2 minutes. An infrared oven is desirably used.

The resulting cured product, identified by numeral 50 is surfaced with a polyester coating and the coating has good gloss and is strongly adherent to the porous substrate.

The initial polyester coating can be, and desirably is, recoated with a second layer of resin, preferably using the same polyester resins used for the first coating. Recoating minimizes board impregnation and yields a more gloss-like appearance using a given weight of polyester resin. To provide sufficient catalyst reactivity to effect a cure of the topcoat without further catalyst coating, the gelled polyester-coated substrate 40, is subjected to heat curing in the oven 16 for only a very short time to effect only a partial cure of the coating, e.g., the substrate is heated to 120° F. for 1–2 minutes. This partial preheating is denoted by a dotted line and produces a partially cured polyester coated substrate 60. The resin topcoat is then applied using any conventional applying means indicated by numeral 17. In the preferred practice of the invention, a curtain coater is used to apply the polyester coating when the thick layers which are preferred are applied. Further, it is preferred that the second coating be applied while the substrate still retains the residual heat of the curing process used to partially cure the first coating, although this is not an essential feature of the invention. The recoated substrate identified by numeral 70, is then cured using any conventional heating means identified by numeral 18. Again, the preferred heating means is an infrared oven maintained at 100–180° F., and the recoated panel is adequately cured by exposure to the elevated temperature within the oven for a minimum of 2 minutes.

This rapid and continuous process yields a coated porous substrate wherein the coating does not blister upon curing despite its thickness and the rapidity of cure, stable polyester resin solutions are used, and the cured coating has good gloss, mar resistance, adhesion to the substrate and solvent resistance. Thus, there is combined in a single process:

(1) Convenient operation with stable resins;

(2) Rapid processing;

(3) The achievement of thick, non-blistered coatings; and (4) Coatings of good physical and chemical properties.

Resin systems useful in the invention are illustrated in Examples 1 and 2 which follow.

EXAMPLE 1

*Polyester production*

2.3 mols of diethylene glycol, 1.0 mol of ethylene glycol, 3.0 mols of fumaric acid and 1.2 mols of dicyclopentadiene are charged to a reactor equipped for azeotropic removal of the water of esterification. 0.1 percent by weight of triphenyl phosphite, based on the total weight of reactants, is added to reduce the formation of color bodies, and xylene in an amount of 3% is added to permit the mixture to be refluxed. The mixture is gradually heated to 425° F. in a nitrogen atmosphere and water of esterification is continuously removed, the condensed xylene being returned to the reactor. The refluxing mixture is maintained at 425° F. with constant removal of water until test specimens show an acid number in the range of 15–40 which indicates that the reaction is sufficiently complete for purposes of the invention. The polyester product is then cooled.

While the temperature of coreaction is not of primary importance, suitable temperatures for the coreaction at atmospheric pressure and in the absence of catalysts are from 375–450° F., the 425° F. temperature set forth in the present example being a particularly preferred reaction temperature.

EXAMPLE 2

*Cure with ethylenically unsaturated monomer (styrene)*

When the polyester product of Example 1 has cooled to a temperature of about 300° F., 100–400 parts per million of para-tert. butyl catechol is added for stability. Upon further cooling to a temperature below 250° F., the solution is thinned to 60% non-volatile solids with styrene to provide a solution of unsaturated polyester and unsaturated monomer (styrene) which is adapted to be copolymerized with the styrene acting as a cross-linking agent for the polyester during the subsequent cure by copolymerizaion. To 100 parts of this solution of polyester in styrene (a minor proportion of xylene is present), is added 20 parts of styrene having dissolved therein 2 parts of a 6% solution of cobalt naphthenate in toluene. The cobalt naphthenate is a promoter which serves as an accelerator for the peroxide catalyst.

EXAMPLE 3

Redwood boards varying in width from 6″ to 10″ are preheated in an oven maintained at 160–180° F. for a period of time sufficient to raise the surface temperature of the wood to 140° F. to drive off entrapped air. The warm porous board is coated with a 60% by weight solution of methyl ethyl ketone peroxide polymerization catalyst in dibutyl phthalate to provide a wet film of 0.3–0.5 mil. The catalyst is applied to the board with a roller coater when the surface temperature of the board is 120° F. The liquid mixture of polyester resin and styrene of Example 2 is then applied to the warm catalyst-impregnated board as a wet film having a thickness of 10–12 mils using a curtain coater. The board temperature at the time of resin application is 100° F. The polyester-styrene mixture, upon contacting the warm catalyst impregnated board, forms a sealing gel of partially cross-linked polyester resin. Then the polyester-coated board is allowed to stand for from 1–2 minutes to permit the gel to solidify and thus prevent the subsequent heat-curing operation from causing blistering of the coating. The polyester coating is thereafter subjected to infrared heating for four minutes (gradually increasing the surface temperature to a maximum of 160–180° F.) to complete the cure.

The coated products thus produced are non-blistered, possess good surface smoothness, gloss, mar resistance and recoatability, and are obtained in a rapid process which is particularly striking in view of the thick coatings which are applied.

EXAMPLE 4

Redwood boards varying in width from 6″ to 10″ are preheated in an oven maintained at 160–180° F. for a period of time sufficient to raise the surface temperature of the wood to 140° F. to drive off entrapped air. The warm porous board is coated with a 60% by weight solution of methyl ethyl ketone peroxide polymerization catalyst in dibutyl phthalate to provide a coating of .3–.5 mil wet film thickness, the catalyst being applied using a roller coater unit and applied to the board when the surface temperature of the board is 120° F. The liquid mixture of polyester resin and styrene of Example 2 is then applied to the warm catalyst-impregnated board as a layer having a thickness of 4–5 mils using a curtain coater. The board temperature at the time of resin application is 100° F. The polyester-styrene mixture, upon contacting the warm catalyst impregnated board, forms a sealing gel of partially cross-linked polyester resin. Then the polyester-coated board is allowed to stand for from 1–2 minutes to permit the gel to solidify and thus prevent the subsequent partial heat-curing operation from causing blistering of the coating. The polyester coating is thereafter subjected to infrared heating for 2 minutes in an oven maintained at 120° F. to partially cure the first coat. The partially cured polyester coated boards are recoated with the liquid mixture of polyester resin and styrene of Example 2 using a curtain coater to provide a layer having a thickness of 4–5 mils. After allowing the resin to partially set for a period of 1–2 minutes, the coating is subjected to infrared heating for a period of 4–8 minutes at 100–180° F. to cure the second coat of resin. The resulting product shows good surface smoothness, gloss, mar resistance, intercoat adhesion and solvent resistance and these results are obtainable in a rapid, continuous process geared to high speed industrial operations.

The invention is defined in the claims which follow.

I claim:

1. A process of coating a porous substrate comprising, in any order, preheating said substrate to a temperature of at least 120° F. to drive off air entrapped therein, applying a solution containing dissolved free-radical generating polymerization catalyst to said substrate to impregnate the surface of said substrate with catalyst, thereafter applying to said catalyst-impregnated heated substrate, while said substrate is at an elevated temperature sufficient to cause said catalyst to release free-radicals, a coating of liquid mixture of ethylenically unsaturated resinous polyester heat-reaction product of ethylenically unsaturated dicarboxylic acid comprising a major molar proportion of fumaric acid, glycol comprising a major molar proportion of polyoxyalkylene glycol having a molecular weight up to about 1200 and diene comprising a major molar proportion of dicyclopentadiene in an amount providing from 0.2–0.6 mol of dicyclopentadiene per mol of said dicarboxylic acid, said dicarboxylic acid and said glycol being employed in equivalent proportions of from 1.5:1 to 1:1.5 based on carboxyl and hydroxyl radicals respectively, and a copolymerizable ethylenically unsaturated monomer for curing said resinous polyester, contact of said liquid mixture with said catalyst-impregnated heated substrate causing gelation of said liquid mixture to seal the surface of said substrate and then heating said coated substrate to at least partially cure said coating.

2. The process of claim 1 in which said porous substrate is cellulosic.

3. The process of claim 1 in which said porous substrate is a wood panel.

4. The process of claim 1 in which said free-radical polymerization catalyst is capable of releasing free-radicals when heated to a temperature of from 30–80° C.

5. The process of claim 1 in which said free-radical polymerization catalyst is methyl ethyl ketone peroxide.

6. The process of claim 1 in which said catalyst is applied to the preheated substrate.

7. The process of claim 1 in which said liquid mixture containing resinous polyester is applied as a viscous layer.

8. The process of claim 1 in which at least 85 mol percent of said unsaturated dicarboxylic acid is fumaric acid.

9. The process of claim 1 in which said polyoxyalkylene glycol is diethylene glycol.

10. The process of claim 1 in which said polyoxyalkylene glycol has a molecular weight not in excess of 600.

11. The process of claim 1 in which said dicarboxylic acid and said glycol components are present in equivalent proportions of from 1.25:1 to 1:1.25 based on carboxyl and hydroxyl radicals respectively.

12. The process of claim 1 in which at least 75 mol percent of said diene is dicyclopentadiene.

13. The process of claim 1 in which said resinous polyester is unsaturated to the extent of at least 40% of the unsaturated dicarboxylic acid present therein.

14. The process of claim 1 in which said ethylenically unsaturated monomer contains the $CH_2=C<$ group.

15. The process of claim 1 in which said ethylenically unsaturated monomer is selected from the group consisting of styrene, vinyl toluene, acrylonitrile, and methyl methcarylate.

16. The process of claim 1 in which said liquid mixture contains at least 0.5 mol of said unsaturated monomer per equivalent of alpha,beta-ethylenic unsaturation in said resinous polyester.

17. A process of coating a porous cellulosic substrate comprising preheating said substrate to a temperature of at least 120° F. to drive off air entrapped therein, applying a solution containing dissolved free-radical generating polymerization catalyst capable of generating free-radicals at a temperature of from 30–80° C. to said substrate to impregnate the surface of said substrate with catalyst while said substrate is at an elevated temperature sufficient to cause said catalyst to release free-radicals, thereafter applying to said catalyst-impregnated heated substrate having a surface temperature of at least 95° F. a coating of liquid mixture of ethylenically unsaturated resinous polyester heat-reaction product of ethylenically unsaturated dicarboxylic acid comprising a major molar proportion of fumaric acid, glycol comprising a major molar proportion of polyoxyalkylene glycol having a molecular weight up to about 1200 and diene comprising a major molar proportion of dicyclopentadiene in an amount providing from 0.2–0.6 mol of dicyclopentadiene per mol of said dicarboxylic acid, said dicarboxylic acid and said glycol being employed in equivalent proportions of from 1.5:1 to 1:1.5 based on carboxyl and hydroxyl radicals respectively, and at least 0.5 mol of a copolymerizable ethylenically unsaturated monomer per equivalent of alpha,beta-ethylenic unsaturation in said resinous polyester, contact of said liquid mixture with said catalyst-impregnated heated substrate causing gelation of said liquid mixture to seal the surface of said substrate and then heating said coated substrate to a temperature of from 100–180° F. to at least partially cure said coating.

18. A process of coating a porous substrate comprising, in any order, preheating said substrate to a temperature of at least 120° F. to drive off air entrapped therein, applying a solution containing dissolved free-radical generating polymerization catalyst to said substrate to impregnate the surface of said substrate with catalyst, thereafter applying to said catalyst-impregnated heated substrate, while said substrate is at an elevated temperature sufficient to cause said catalyst to release free-radicals, a coating of liquid mixture of ethylenically unsaturated resinous polyester heat-reaction product of ethylenically unsaturated dicarboxylic acid comprising a major molar proportion of fumaric acid, glycol comprising a major molar proportion of polyoxyalkylene glycol having a molecular weight up to about 1200 and diene comprising a major molar proportion of dicyclopentadiene in an amount providing from 0.2–0.6 mol of dicyclopentadiene per mol of said dicarboxylic acid, said dicarboxylic acid and said glycol being employed in equivalent proportions of from 1.5:1 to 1:1.5 based on carboxyl and hydroxyl radicals respectively, and at least 0.5 mol of a copolymerizable ethylenically unsaturated monomer per equivalent of alpha-beta-ethylenic unsaturation in said resinous polyester, contact of said liquid mixture with said catalyst-impregnated heated substrate causing gelation of said liquid mixture to seal the surface of said substrate, then heating said coated substrate to partially cure said coating, overcoating said partially cured coated substrate with said liquid mixture of resinous polyester heat-reaction product while said substrate retains the residual heat used to partially cure the same, and then heating said overcoated substrate to cure said overcoating.

References Cited in the file of this patent
UNITED STATES PATENTS

| | | |
|---|---|---|
| 2,671,070 | Knapp | Mar. 2, 1954 |
| 2,978,354 | Lesser | Apr. 4, 1961 |
| 3,029,159 | Bliven et al. | Apr. 10, 1962 |